Feb. 3, 1959   A. L. WARD   2,871,994
POSITIONAL CONTROL FOR BRAKE SHOES
Filed June 14, 1954   4 Sheets-Sheet 1
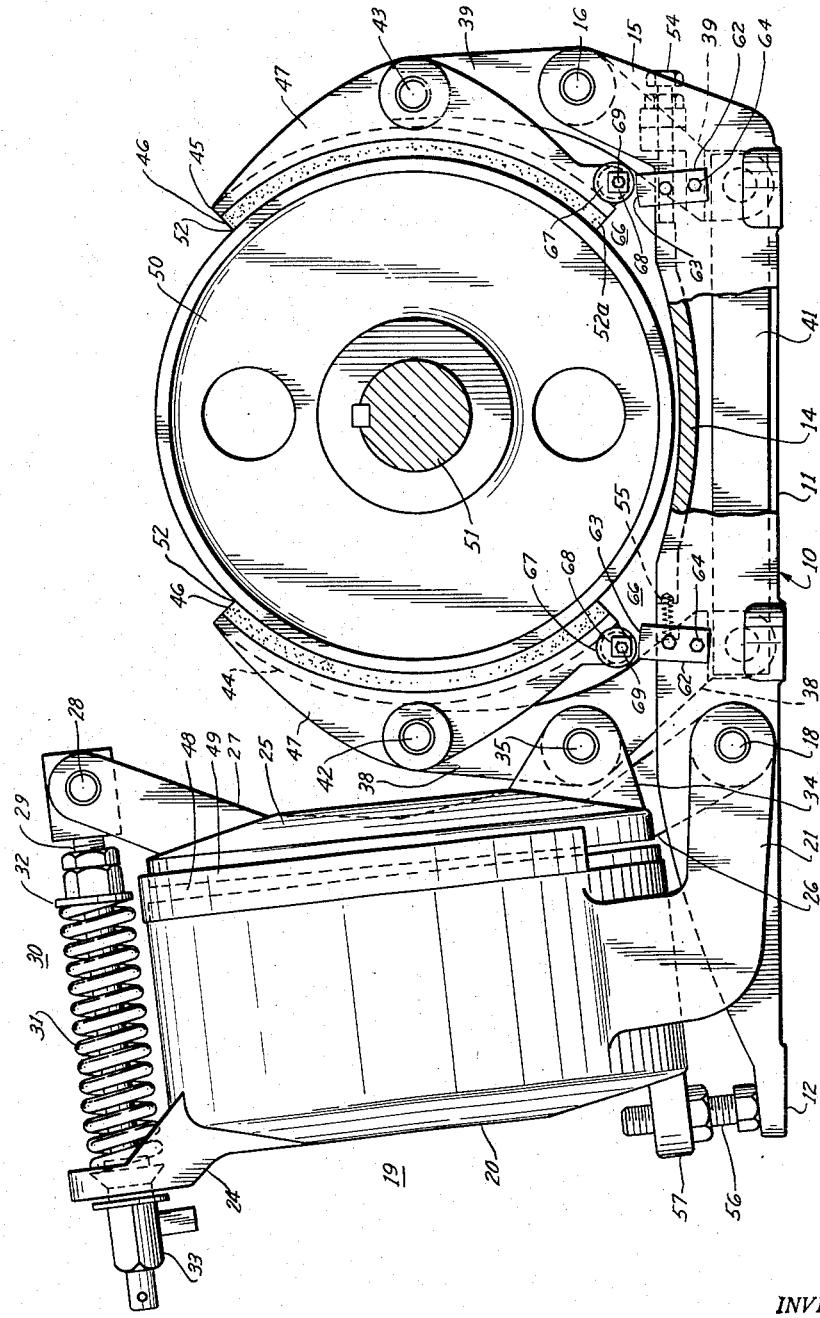
INVENTOR.
ARTHUR L. WARD
BY
ATTORNEYS.

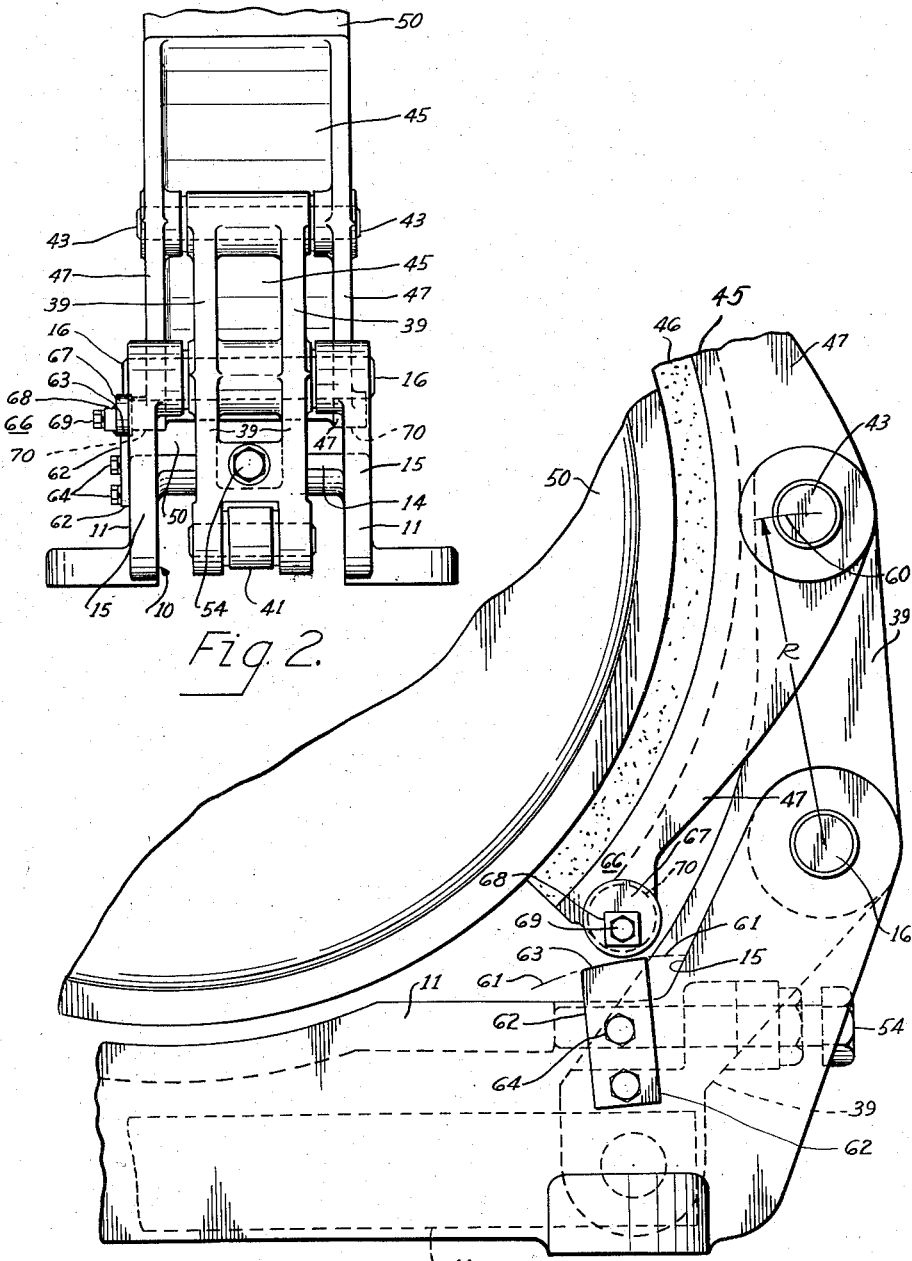

Feb. 3, 1959  A. L. WARD  2,871,994
POSITIONAL CONTROL FOR BRAKE SHOES
Filed June 14, 1954  4 Sheets-Sheet 3

INVENTOR.
ARTHUR L. WARD
BY
ATTORNEYS.

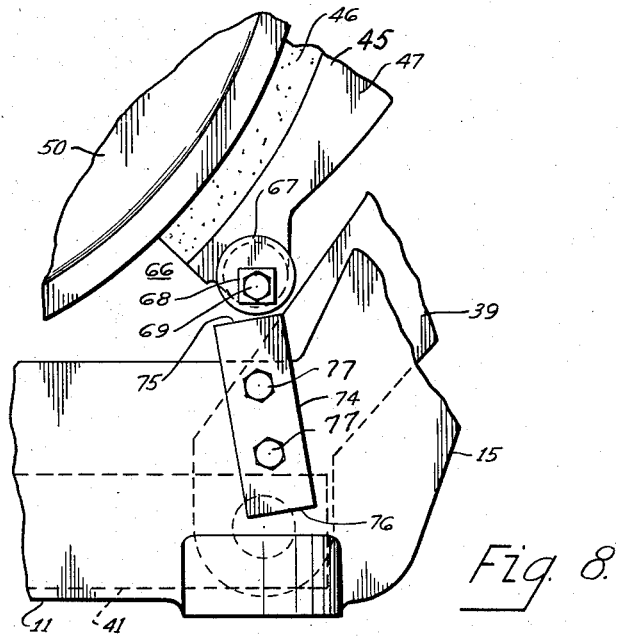
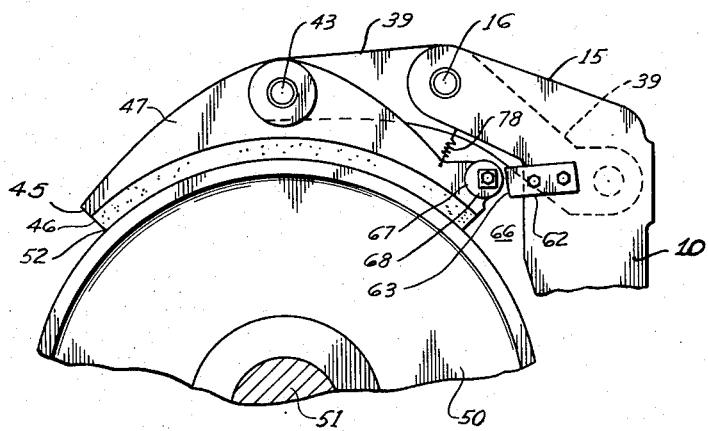

United States Patent Office 2,871,994
Patented Feb. 3, 1959

2,871,994
POSITIONAL CONTROL FOR BRAKE SHOES

Arthur L. Ward, Cleveland, Ohio, assignor, by mesne assignments, to Square D Company, Detroit, Mich., a corporation of Michigan Application June 14, 1954, Serial No. 436,353

7 Claims. (Cl. 188—75)

This invention relates to a brake in which one or more pivoted brake shoes having arcuate friction surfaces are engaged with and disengaged from a brake drum, selectively, and more particularly to means for maintaining the arcuate surfaces substantially concentric with the drum when the shoes are in their disengaged positions and thereby preventing riding of any part of the shoes on the drum while the brake is released.

This application is a continuation-in-part of my application Serial No. 422,491, filed April 12, 1954, now abandoned.

Each of the shoes of such brakes commonly has a lining of friction material which extends for a considerable distance around the drum. Generally two shoes are used each of which is pivoted on a horizontal pivot at or near the center of the circumferential dimension of the shoe and usually offset radially from the center of gravity of the shoe. The pivot axes are on opposite sides of the drum, respectively, and when the brake is applied are in a common plane with the axis of the drum. The pivotal mounting of the shoes permits substantially complete contact between the shoe and the drum circumferentially of the drum when the pivot axes are moved to positions where the lining portions of the shoe engage the drum. A disadvantage of such a pivotal mounting for the shoes is that gravity tends to rotate or tilt the shoes about their pivot axes when the axes are moved to their released positions. If this tilting is not prevented, the lining portion drags on the drum at the intersection of the upper end of the lining portion with the drum engaging face thereof causing deleterious wear and heating.

Various means have been used to prevent this undesired tilting of brake shoes. For example, means have been provided to increase the friction at the pivot sufficiently to prevent gravitational tilt of the shoe but not sufficiently to impair the ability of the shoe to turn on its pivot to secure the required accurate alignment upon engagement of the lining with the drum. Devices for increasing the friction, however, are not entirely satisfactory because the amount of friction changes in service and, especially in the case of large brakes, because of the extra cost and complexity involved. A set screw positioned to be engaged by the lower end portion of the shoe has also been used to prevent the upper end portion of the shoe from tilting enough to cause the contact hereinbefore described. Set screws are undesirable because they must be adjusted frequently as the linings wear. An adjustable stop comprising a surface movable by the shoe against a spring imposed frictional force to a new position as the lining wears has been used, but its cost is relatively high, it is difficult to apply to many brake designs, and it is apt to become inoperative due to the effects of surrounding conditions of use.

An object of this invention is to provide improved means for preventing riding of any portion of the shoe on the drum while the brake is released, which, when the shoe clearance is very small, requires that the pivoted brake shoe be substantially concentric with the brake drum when the shoe is in its released position.

Another object of this invention is to prevent a brake shoe from tilting excessively by means which does not involve the use of friction and which without adjustment prevents excessive tilting throughout the life of the shoe lining.

A further object is to provide an improved means which is operative in any turned position of the brake for preventing a brake shoe from riding on a brake drum or wheel when released.

A more specific object is to provide a fixed stop surface for the lower end portion of a horizontally pivoted brake shoe which is so positioned and shaped that, at any time throughout the life of the lining, the shoe cannot touch the brake drum while the brake is released.

A detailed object is to provide a fixed stop surface engageable by a stop member on the lower end portion of a pivoted brake shoe and so positioned and shaped that it prevents riding of the shoe on the drum or wheel by holding the shoe substantially concentric with the drum, when the shoe is in released position, irrespective of the thickness of the lining portion of the shoe.

A further object is to provide a stop having a fixed surface defining the path which must be followed by the lower end portion of a released brake shoe if the lining is to be maintained concentric with the brake drum in different adjusted positions of the shoe pivot effected for compensating for lining wear.

These objects are accomplished in accordance with the present invention by providing a rigid stop, having a fixed stop surface, on the brake frame or base adjacent to the lower end portion of a brake shoe and accurately positioned along the arcuate path which must be followed by the lower end portion of the released shoe as the shoe pivot is shifted to compensate for lining thickness decreases with wear. An adjustable stop on the lower end portion of the shoe engages the stop surface of the rigid stop when the brake is released. When the brake is adjusted to compensate for lining wear, the line of engagement of the stop on the shoe with the stop surface changes, but the position and shape of the fixed stop surface is such that concentricity of the released shoe and drum is maintained regardless of the changes in the line of engagement. Since the total arc of movement of the lower end portion of the released shoe throughout the life of a lining is short relative to the radius of the arc, the stop surface can be a flat surface approximating the length and position of the arc or path through which the stop on the shoe would move were the released shoe at all times exactly concentric with the drum and such a flat surface, in most cases, approaches sufficiently closely the optimum path to provide essentially the same operation. The adjustablity of the stop on the shoe permits initial selection of the shoe clearance and need not be altered again during the life of the lining.

Other objects and advantages will become apparent from the following specification wherein reference is made to the drawings, in which Figure 1 is a side elevation of a brake with the present invention installed;

Figure 2 is an end elevation of the structure of Figure 1 viewed from the right of Figure 1 with portions at the left-hand end of the brake removed;

Figure 3 is a fragmentary view, partly diagrammatic, showing positional relationships involved in the invention;

Figure 8 illustrates a modification of the invention; and

Figure 9 shows the invention of Figures 1 and 2 as applied to a vertically mounted brake.

Figure 4:
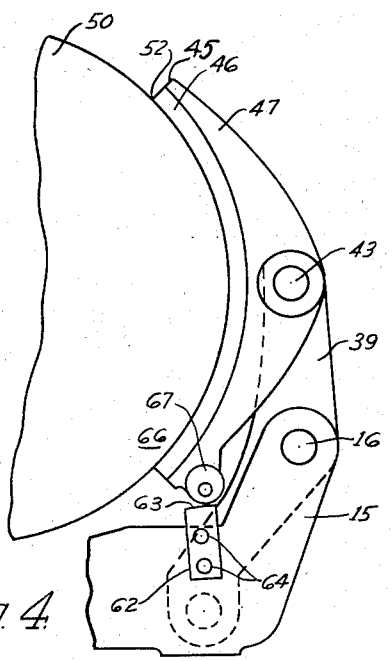
Figures 4 and 5 are fregmentary views showing the relative positions of the stops in applied and released positions, respectively, of one of the shoes in Figures 1 and 2 when the linings are new.

Referring to Figures 1 and 2, a brake of the type to which the present invention can be applied may comprise a metal support or base 10 having a pair of spaced-apart, horizontal arm portions 11 extending from a common portion 12 and rigidly held in laterally spaced relation by an intermediate web 14. Each of the arm portions 11 has at its free end an upstanding portion 15. Each portion 15 has an opening which rotatably receives an end portion of a horizontally disposed pin 16 which is common to both portions 15. A second pair of aligned openings are formed in the arm portions 11 between the web 14 and the common portion 12 and rotatably receive a pin 18 common to both portions 11.

A magnet 19 for releasing the brake includes a cylindrical magnetic case 20 and a concentric central magnetic pole piece (not shown) defining an annular coil space for an operating coil (not shown). The case 20 has a pair of horizontally-spaced, depending, perforated arms 21 rotatably received on the outer end portions, respectively, of the pin 18, and has an upwardly-extending perforated lug 24. A generally circular armature plate 25 has a pair of downwardly-extending, laterally-spaced, perforated arms 26 rotatably received on the pin 18 between the arm portions 11 and has a pair of upwardly-extending, laterally-spaced, perforated arms 27 rotatably receiving a pin 28 which pivotally supports an enlarged squared-end portion of a threaded rod 29 forming part of a spring mechanism 30. The spring mechanism 30 also includes a brake-applying compression spring 31 surrounding the rod 29, the threaded end portion of which passes through the perforation in the lug 24. One end of the spring 31 abuts the lug 24 and the other end bears against an adjustable stop 32 on the rod 29 so that the spring normally urges the armature 25 in a clockwise direction about the pin 18. A normally inoperative nut 33 received on the rod 29 outside of the lug 24 is operable by an operator to release the brake, if desired, when the coil is not energized.

From the lower periphery of the armature 25 extends a pair of horizontally-spaced, perforated lugs 34 rotatably carrying a pin 35 on which is pivotedly mounted a brake shoe lever 38. A similar brake shoe lever 39 is pivotedly mounted on the pin 16 carried by the upstanding base portions 15. The lower end portions of the levers 38 and 39 are pivotally connected to opposite end portions, respectively, of an operating rod 41 disposed beneath the web 14. The upper end portions of the levers 38 and 39 rotatably carry horizontal pivot pins 42 and 43, respectively, on which are freely pivoted a pair of identical arcuate brake shoes 44 and 45, respectively. Each of the shoes 44 and 45 has a friction lining 46 and, at the face opposite the lining, has a pair of laterally spaced flanges 47 midway between its ends which have aligned openings, respectively, usually positioned circumferentially of the shoe and which rotatably receive the associated one of the pins 42 and 43.

Figure 5:
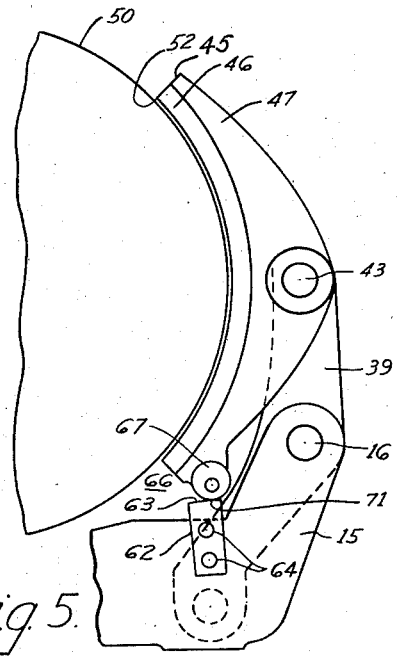
Figure 7:
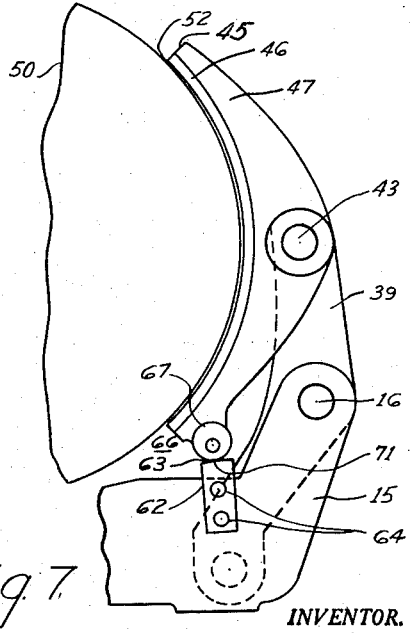

As long as the operating coil of the magnet 19 is deenergized, the spring 31 forces the armature 25 clockwise about the pin 18 to define an annular air gap 48 protected by a dust shield 49. With the armature 25 in its clockwise turned position, the lever 38 is forced to the right as viewed in Figure 1 and, through the action of the operating rod 41, the upper end portion of the lever 39 is forced to the left so that the linings 46 on the shoes 44 and 45 are engaged with a brake drum or wheel 50 keyed to a shaft 51 to be braked. The center lines of the pins 42 and 43 and the shaft 51 lie in a common horizontal plane when the shoes 44 and 45 engage the wheel 50. When the operating coil is energized, the armature 25 is magnetically pulled counterclockwise against the case 20 further compressing the spring 31 and causing the levers 38 and 39 to move the shoes 44 and 45 away from the brake wheel 50. When the levers 38 and 39 are in their released positions, the center lines of the pins 42 and 43 are in a common plane slightly above the center line of the shaft 51 (Figures 5 and 7). Each of the pins 42 and 43 is offset from the center of gravity of its associated one of the shoes 44 and 45, this offset being in directions away from the wheel 50, and consequently the upper end portions of the shoes tend to rotate toward the wheel due to gravity when the shoes are released.

A brake similar to that just described is disclosed in detail in Hall Patent No. 1,672,314. As will become apparent, the present invention may be applied to brakes other than the one shown by way of illustration. It will be understood that suitable means (not shown) may be used to maintain the several pins in position and that suitable bearings for the pins may be provided.

Since each of the shoes 44 and 45 is arcuately shaped and is supported for pivoting freely about the horizontal axis of its associated one of the pins 42 and 43, but not about its own center of gravity, the upper end thereof tends to rotate due to gravity, toward the wheel 50 when the shoe is in its released position. This gravitational tilt, if not prevented, causes each lining, at the intersection of its operating face and upper end, to remain in contact with or ride on the brake wheel 50, for example, along a line or area of contact indicated at 52. When the area 52 rides on the wheel, chamfers are formed by frictional wear, thus shortening the effective length of the linings 46 and causing excessive heating of both the wheel 50 and the linings 46. This results in reduced braking force and often causes destruction of the wheel or linings or both. In accordance with the invention hereinafter to be described, means which do not require adjustment throughout the life of the linings 46 are provided to maintain the linings 46 substantially concentric with the brake wheel 50 when the shoes 44 and 45 are in their released positions.

In order to appreciate the problems encountered in adjustment of brakes such as hereinbefore described, the prior manner of adjustment must be understood. In accordance with prior practice to adjust the brake for proper clearance between the shoes 44 and 45 and the brake wheel 50 when the linings 46 are new, the air gap 48 is closed either by energizing the operating coil or by turning the nut 33 to compress the spring 31 thereby to hold the armature 25 against the case 20. A set screw 54 threaded through an opening in the brake lever 39 bears against a right hand end face of the web 14 of the frame 10 and is then turned until the clearance between the lining 46 on the shoe 45 and the wheel 50 is at the desired value. This clearance is usually about $\frac{1}{32}$ of an inch. A weak compression spring 55 between a left hand end face of the web 14 and the lower end portion of the lever 38 maintains the set screw 54 in engagement with the web 14. A set screw 56 threaded through an opening in a lug 57 on the magnet case 20 and bearing against the portion 12 of the base 10 is then turned until the clearance between the lining 46 on the shoe 44 and the brake wheel 50 is at the same desired value. Repeated alternate adjustments of the set screws 54 and 56 are generally necessary before the shoe clearance is uniform and the brake is ready for operation.

As the brake linings 46 wear, the length of the air gap 48 increases. Long before the linings 46 are worn out, the air gap 48 can become so large as to cause sluggish or delayed release of the brake or to prevent release when the coil is energized. The length of the air gap 48 and the shoe clearance are preferably returned to normal before this inoperative condition is reached. To do this, the screw 56 is adjusted to reduce the air gap to the proper value for the desired torque setting of the spring 31. The brake must then be released by closing the armature 25 so that it can be determined whether the clearance between the brake wheel 50 and the shoes 44 and 45 is uniform. If the shoe clearance is not uniform, the set screws 54 and 56 must again be adjusted.

Equivalent adjustments must be made on other brakes of similar design whether they are operated magnetically or by other means such as air or liquid. Heretofore, when such adjustments have been made on brakes provided with set screws for preventing excessive shoe-tilt, it has been necessary also to adjust these set screws to insure concentricity between the shoes and wheel.

The means now to be described and which embodies the present invention, maintains the shoe linings substantially concentric with the brake wheel throughout the life of the linings and independently of the adjustments made on the brake disclosed by the screws 54 and 56.

Figure 6:
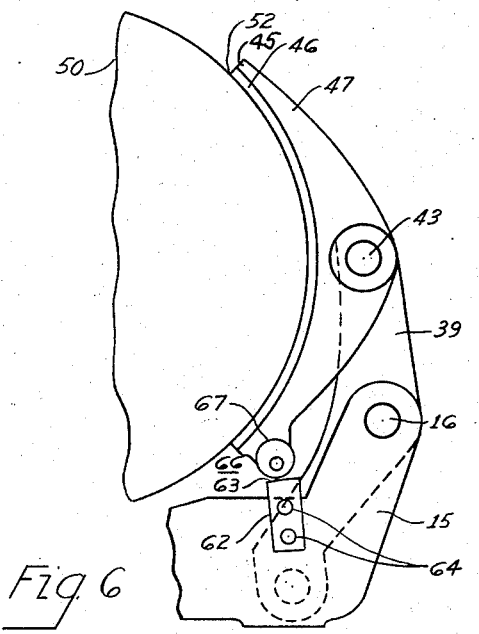
Figures 6 and 7 are fragmentary views, showing said relations when the linings are worn and the brake has been adjusted to compensate for the lining wear.

Referring to Figures 1 and 3, it will be noted that during application and release of the brake the axis of the pin 43 on which the shoe 45 is pivotally mounted swings back and forth a short distance along a path 60 which is an arc of a circle having its center at the center of the pin 16. As the lining 46 on the shoe 45 wears and decreases in thickness, the amount of movement of the pin 43 along the arc 60 gradually increases during each operation of the brake since the thinner lining permits the shoe 45 to move farther to the left toward the brake wheel 50. If concentricity between the periphery of the wheel 50 and the lining 46 on the shoe 45 when released is to be maintained as the lining wears, the shoe must remain parallel to its applied position and this necessitates its rocking about the axis of the pin 43. Correspondingly, if this parallel relation is to be maintained, it would at first appear that a fixed point on the lower end portion of the shoe 45 must follow a path which is an arc identical with the path 60 in spaced relation to the arc of the path 60 and so related to it that tangents through corresponding points on the two arcs are parallel to each other. It is to be noted, however, that, to maintain this concentricity, the shoe 45 must turn counterclockwise with respect to the lever 39 each time the brake is released by swinging the lever 39 clockwise about the pin 16. This slight turning of the shoe 45 with respect to the lever 39 as the brake operates with new linings is indicated also by comparing Figures 4 and 5, and with worn linings by comparing Figures 6 and 7.

In fact, however, for greatest precision in maintenance of concentricity, the arc of the path of the fixed point on the lower end of the brake shoe 45, which path is indicated at 61, must not be so related to the arc of the path 60 that the tangents through corresponding points on the two arcs are exactly parallel to each other. For true concentricity the deviation from exact parallelism exists and had best be taken in account in determining the exact contour of the arc of the path 61 in the case of large diameter shoes. This deviation from exact parallelism occurs because, after the axial center line of the pin 43 is moved to the left along the path 60 to advance the shoe clearance, the shoe 45 when engaged with the wheel turns clockwise slightly with respect to the lever 39 from its initial preadjustment position. This clockwise turning of the shoe 45 results because the cord connecting the ends of the lining 46 when the engaged lining is concentric with the wheel 50, shifts so as to always be perpendicular to the line connecting the axis of the wheel 50 with the instantaneous position of the center of the pin 43 and this line changes slightly from the horizontal as the lining 46 wears and the center of the pin 43 moves downwardly and inwardly from its initial position. The increment of downward movement of the axis of the pin 43 for an increment of inward movement of said axis increases progressively as the lining approaches the condition of maximum wear. Accordingly, instead of the tangents to corresponding points on the paths 60 and 61 being parallel, the corresponding tangents on the paths 60 and 61 must converge generally toward the wheel to compensate for the downward movement of the center of the pin 43. The convergence is roughly about 1° to 2° but the path 61 is best determined by actual plotting of the path of the fixed point on the lower end of the shoe as the shoe is moved from its preadjusted position with a new lining to its final operating position with a worn out lining ready for replacement.

If means were not provided to maintain the concentricity between the wheel 50 and the lining 46 of the shoe, either the upper or lower end areas of the lining would remain in contact with the wheel 50.

For example, assuming that the shoe 45 is mounted on its pin 43 so that either the shoe or pin can turn readily and not constrain the shoe to fixed position relative to the lever 39, the shoe will remain in contact with the wheel by turning further in a counterclockwise direction with respect to the lever 39 each time the brake is released. On the other hand, if the connection between the shoe 45, the pin 43, and lever 39 were sufficiently tight so that the shoe was yieldably restrained frictionally from turning about the axis of the pin 43 relative to the lever 39, then the area 52a of the lining at the opposite or lower end of the shoe 45 would remain in contact with the wheel 50 each time the brake is released, inasmuch as this lower end is below the axis of the pin 16. Ordinarily, it is preferable to make the connection between the pin 43, shoe 45, and lever 39 such that the shoe can rock freely about the pin axis and thereby be urged by gravity to rotate in a counterclockwise direction. If, however, the shoe 45, pin 43, and lever 39 fit so that the frictional force yieldably restrains the shoe from rocking about the pin axis, then by connecting a spring to the lower end of the shoe the frictional resistance can be overcome and the shoe rotated by the spring in the counterclockwise direction. The latter operation is equivalent to that which would result from the combination of a loose fitting pin and gravity.

In each instance, a means (either gravity or a spring) is provided and holds the area 52 of the lining in contact with the wheel 50 unless moved out of such contact by other means.

To maintain the lining 46 on the shoe 45 substantially concentric with the wheel 50 in accordance with this invention under each of the above conditions, a stop member or rail 62 having a hardened arcuate upper surface 63 is suitably secured beneath the shoe 45 on one side of the base 10 as by a pair of cap screws 64. The rail 62 is so mounted and the surface 63 is so formed that all points on the surface 63 fall along the path 61.

An adjustable stop member 66 comprises a surface hardened eccentric cylindrical abutment 67 welded or otherwise secured to an adjacent square portion 68 and suitably fastened to the shoe 45 directly above the rail 62 as by a cap screw 69 received in a tapped opening in one of a pair of outwardly directed bosses 70 formed on the lower end portion of the flanges 47, respectively, of the shoe 45. By turning the abutment 67 about the screw 69, preferably by a wrench received on the portion 68, the peripheral surface of the abutment 67 is made to touch the surface 63 along a line 71 (Figure 5) when the brake is released and the clearance between a new lining 46 and the wheel 50 is proper and the lining is concentric with the wheel 50. This adjustment of the abutment 67 permits it to be accurately positioned with respect to the surface 63 so as to compensate for the effect of tolerances required in the manufacture of the various parts of the brake.

Each time that the shoe 45 moves from its applied to its released position, the area 52 rides on the wheel 50 until the abutment 67 strikes the adjacent curved surface 63. The area 52 thereby is caused to move away from the wheel 50 so that the lining 46 of the shoe 45 again becomes concentric with the wheel 50.

As the lining 46 wears, the amount of movement of the axis of the pin 43 along the path 60 increases. This is accompanied by an increase in the length of the air gap 48. When the brake is adjusted to return the air gap length to normal, the axis of the pin 43 when the lever is in its released position is still on the path 60 but is closer to the wheel 50. The line of contact 71 between the abutment 67 and the surface 63 also is moved to the left as can be seen by comparing Figures 5 and 7. Since the paths 60 and 61 are related as described above, the shoe 45 is maintained concentric with the wheel 50 after adjustment of the air gap. After adjustment, the amount of movement of the axis of the pin 43 along the path 60 from released to applied position is the same as with a new lining but the starting position is displaced from its original position toward the wheel 50.

A similar rail 62 is also mounted on the frame 10 beneath the lower end portion of the shoe 44 which also carries a stop member 66. The axis of the pin 42 like that of the pin 43 moves along an arcuate path corresponding to the path 60 and the curved surface 63 of the rail 62 associated with the shoe 44 is so related to this path that the abutment 67 on the shoe 44 strikes its associated surface 63 to maintain the lining 46 of the shoe 44 concentric with the wheel 50 throughout the life of the lining.

Preferably both sides of the frame 10 and the bosses 70 on the shoes 44 and 45 are drilled and tapped so that the rails 62 and the stop members 66 can be mounted on the side of the brake which is most accessible after the brake is installed. This facilitates adjustment of the cams 67 should it be necessary to do so when new linings are installed.

In the modification of Figure 8, a rectangular rail 74 having end surfaces 75 and 76 is fastened to the frame 10 by cap screws 77 so that the upper planular end surface 75 closely approximates the arcuate path 61. Although the surface 75 is flat, it has been found in practice that even for brakes of considerable size and radius of the path 61 is so long relative to the amount of movement along the path 61 that the arcuate path may be treated as linear. Also, concentricity of the shoe and wheel is not critical, the critical relation being adequate clearance between the shoe and wheel and positioning of the shoe about its pivot so that no part of the shoe rides on the wheel. Of course, in many brakes, the clearance between the shoe and wheel is so slight that unless substantial concentricity is maintained, the shoe will be tilted so as to ride on the wheel. Preferably the openings in the rail 74 and frame are so positioned relative to the surfaces 75 and 76 that the rail 74, even if reversed by turning end for end or by turning face for face, or both, in assembly will present a surface 75 or 76 in the proper location and disposed at the desired angle.

Thus, it is impossible to install one of the rails 74 other than in the proper position.

It will be understood that the required adpustment may be provided by adjustably mounting the rails 62 or 74 instead of providing for the adjustment of the stop member 66. It is also apparent that an integral part of the frame 10 can be a stop with the surface 63 or 75 thereon.

In the brake as so far described, it has been assumed that the frame 10 is mounted on a horizontal surface. In some instances, it is desired to mount the brake with the base of its frame other than horizontal. For example, Figure 9 shows a portion of the brake when the brake is mounted with the base 10 on a vertical surface. Since the shoe 45 in Figure 9 is approximately balanced on the pin 43, it may tend to tilt in either direction when released. To insure that the abutment 67 engages the surface 63 when the shoe moves to its released position, a tension spring 78 suitably secured at one end to the shoe 45 and at the other end to the lever 39 is provided to perform the function otherwise performed by gravity. The spring 78 thus pulls the end portion of the shoe 45 nearest the base 10 toward the lever 39 when the brake is released. The abutment 67 is thus caused to engage the surface 63 resulting in substantial concentricity between the lining 46 on the shoe 45 and the wheel 50 the same as when the base of the brake is horizontal.

A similar spring arrangement may be used to insure that the shoe 44 of a vertically mounted brake turns in the proper direction upon release of the brake. It is obvious that other spring connections may be used to insure engagement of the abutments 67 on both shoes 44 and 45 with their associated stop surfaces 63 when the brake is mounted in turned positions other than those illustrated.

Thus having described my invention, I claim:

1. The combination with a braking structure comprising a support, a pivoted brake-shoe-carrying lever mounted thereon, an arcuate brake shoe freely pivoted on said lever for rocking about an axis spaced from the pivot axis of said lever, a brake wheel arranged to be operatively engaged and disengaged by said shoe as said lever rocks on its pivot axis to applied and released positions, respectively, means for adjusting the lever to different released positions, selectively, means operable for continuously urging one end portion of said shoe to remain in contact with said wheel in all released positions of said lever, a stop on said shoe presenting a stop surface in fixed relation to the shoe, a stop on said support presenting a stop surface in fixed relation to the support, said stop surfaces being mutually engageable to cause a force to be exerted on said shoe at a location on the opposite side of said pivot axis of said shoe from said one end portion of the shoe and to control movement of the shoe about the pivot axis of the shoe as the lever moves away from its applied position toward any pre-selected one of the released positions, and being so shaped and positioned that, while in said operative engagement with each other, the shoe is constrained thereby to rotate about its pivot so as to dispose both end portions of the shoe in spaced relation to said wheel upon operating movement of the lever to any one of said adjusted positions, at least one of said stop surfaces further being shaped so as to mutually constrain themselves to a line-to-line contact in all mutually engaged positions thereof, and said stop surface of the stop on the support being approximately identical with the arcuate path defined by the pivot axis of the shoe as the lever is moved from the applied position to the released position farthest therefrom with the tangents to all points on said arcuate path being approximately parallel to, but converging at a small angle with, the corresponding points on the said stop surface of the stop on the support.

2. The structure of claim 1 characterized in that said stop surface of the stop on the support defines an arc which is approximately identical with the arcuate path defined by the pivot axis of the shoe as the lever is moved from the applied position to the released position farthest therefrom and the tangents to all points on said arc are approximately parallel to, but convergent, at a relatively small angle, with the tangents to the corresponding points on the arcuate path.

3. The structure of claim 1 characterized in that said stop on the support is a detachable member and elements are provided for locating and securing it on the support in two positions, selectively, and said member has two spaced surfaces so arranged that in one of the positions one of said surfaces provides its stop surface and in the other of the selected positions, the other surface provides its stop surface, and identical elements locate and secure it in either position.

4. The structure of claim 3 characterized in that said member is symmetrical in cross section about its longitudinal median line and in longitudinal section about its transverse median line.

5. The structure of claim 4 characterized in that the member is a right angled parallelpiped.

6. The structure of claim 2 characterized in that the said tangents converge at a relatively small angle in a direction toward the wheel.

7. The structure according to claim 2 characterized in that said stop surface of the stop on the support, is the path followed by the outermost portion of the stop on the shoe as the shoe, with its lining maintained concentric with the wheel, is moved from its released original adjusted position with the lining new to its released final position with the lining worn out.

References Cited in the file of this patent

UNITED STATES PATENTS

| | | |
|---|---|---|
| 2,118,960 | Whitford | May 31, 1938 |
| 2,377,817 | Smith | June 5, 1945 |
| 2,436,880 | Burgett | Mar. 2, 1948 |
| 2,491,850 | Browning | Dec. 20, 1949 |